United States Patent [19]

Oura et al.

[11] Patent Number: 4,772,978
[45] Date of Patent: Sep. 20, 1988

[54] TRANSFORMER PROTECTION SYSTEM

[75] Inventors: Yoshifumi Oura, Ichihara; Kunio Matsuzawa, Sagamihara; Kazuyoshi Yoshida, Tokyo; Keizo Inagaki; Hiroyuki Kudo, both of Hitachi; Yoshihiro Sano, Katsuta, all of Japan

[73] Assignees: Hitachi, Ltd.; The Tokyo Electric Power Co., both of Tokyo, Japan

[21] Appl. No.: 918,038

[22] Filed: Oct. 14, 1986

[30] Foreign Application Priority Data

Oct. 14, 1985 [JP] Japan .................. 60-226788

[51] Int. Cl.$^4$ .......................................... H02H 7/045
[52] U.S. Cl. ........................................ 361/36; 361/80; 340/646
[58] Field of Search ............... 361/35, 36, 78, 79, 361/80; 364/483, 492; 340/646

[56] References Cited

U.S. PATENT DOCUMENTS 4,377,833  3/1983  Udren .................. 361/79

FOREIGN PATENT DOCUMENTS 161043  11/1979  Japan ................... 361/35
59-25527  9/1984  Japan .

OTHER PUBLICATIONS

"Digital Protection Method for Power Transformers Based on an Equivalent Circuit Composed of Inverse Inductance", by Inagaki et al., IEEE, 1987.
"A New Technique for H-speed Transformer Fault Protection . . . ", by Sykes, IEEE, 9th–11th Jul., 1972, pp. 1–7.

Primary Examiner—A. D. Pellinen
Assistant Examiner—Derek S. Jennings
Attorney, Agent, or Firm—Antonelli, Terry & Wands

[57] ABSTRACT

In a transformer protection system, data of voltages and currents detected at individual terminals of a transformer connected to an electric power system are supplied to a computer. The computer computes driving point admittances or shunt admittances of the transformer on the basis of the voltage and current data and predetermined transfer admittances of the transformer and decides that an internal fault has occurred in the transformer when the values of the driving point admittances or shunt admittances deviate from pre-set reference values, thereby disconnecting the transformer from the electric power system.

27 Claims, 8 Drawing Sheets

TRANSFORMER PROTECTION SYSTEM

BACKGROUND OF THE INVENTION

This invention relates to protection of transformers, and more particularly to a transformer protection system using a computer for processing various data for the protection of a transformer installed in a power transmission system.

A protective relay device based on the differential principle is now widely used for protecting a transformer installed in a power transmission system. This device decides that an internal fault has occurred in the transformer when the vector sum of currents detected at the terminals of the transformer is not equal to zero. However, the vector sum of the currents is not equal to zero immediately after the transformer is connected to the power transmission line by turning on a circuit breaker, and, as a result, the protective relay device based on the differential principle would act to trip the circuit breaker by deciding that an internal fault has occurred in the transformer. A method proposed to deal with such a defect is based on the finding that a magnetizing inrush current flowing through the transformer at the instant of insertion of the transformer to the power transmission system includes a second harmonic in a large amount. According to the proposed method, the circuit breaker is prevented from being tripped by the protective relay device based on the differential principle when the presence of the second harmonic in an amount more than a predetermined value is detected. A protection system resorting to such a method is now most widely adopted in this field.

However, in a modern very large electric power system, frequency components close to the frequency of the second harmonic tend to be normally included in the power supplied by the electric power system. This results in an adverse effect that a proper command for tripping a circuit breaker is not applied in the event of occurrence of an internal fault of a transformer, resulting in an increased possibility of failure to reliably detect the internal fault by a prior art protective relay device based on the differential principle. As far as such a protective relay device composed of an analog circuit is used, it is unable to attain the desired protective function which can accurately detect the internal fault only, and which is not responsive to an external fault or to the turning-on of the circuit breaker. Thus, a protective relay system for a transformer has been developed which is based on an entirely novel operating principle free from the prior art operating principle such as the differential principle. The outline of this novel protection system is such that a numerical formula is provided which simulates the characteristics of a transformer by the use of a digital computer, and voltage and current values actually detected at the terminals of the transformer are put into the numerical formula so as to decide whether or not an internal fault has occurred in the transformer. (In the prior art, current values only have been detected for the purpose of protection.) A digital type protection system as disclosed in JP-A-59-25527 published on Feb. 9, 1984 is an example. The features of the proposed protection system are as follows:

(a) When a differential current computed on the basis of currents detected at the terminals of windings of a transformer exceeds a predetermined detection leve, decision is made as to whether or not the following relation holds:

$$[V] - [l][di/dt] = [0] \quad (1)$$

or $$[y][\int Vdt] - [\int di] = [0] \quad (2)$$

where [V] is a column vector of terminal voltages of the transformer windings; [i] is a column vector of terminal currents of the transformer windings; [l] is an inductance matrix of self-inductances and mutual inductances of the windings when the iron core of the transformer is magnetically saturated; and [y] is an admittance matrix which is an inverse matrix of [l].

(b) A magnetizing inrush current flows as a result of magnetic saturation of the iron core of the transformer. Therefore, in view of the character of the principle of decision, the equation (1) or (2) holds substantially when the current is substantially composed of the magnetizing inrush component. When, on the other hand, an internal fault occurs in the transformer, the equation (1) or (2) does not hold because, in such a case, at least one of the windings is not sound, and the transformer core is not generally magnetically saturated.

(c) Therefore, the presence of an internal fault is identified only when the result of computation of the left-hand members of the equation (1) or (2) is not equal to zero.

According to the known digital type protection system described above, a magnetizing inrush current and a current attributable to an internal fault can be discriminated from each other irrespective of their current waveforms. Thus, the transformer can be protected with high reliability.

In the case of the known digital type protection system, the inductance matrix [l] or the admittance matrix [y], which is the coefficient in the equation (1) or (2), must be previously computed on the basis of the dimensions of the transformer windings. However, there are the following problems for the detection of the internal fault with high sensitivity:

(a) A slight error occurs inevitably between the actually detected value and the computed value. Thus, even in the case of the magnetizing inrush current, the result of computation of the left-hand members of the equation (1) or (2) is not perfectly equal to zero, and this obstructs the detection of the internal fault with high sensitivity.

(b) Complicated computation formulas are required for accurate determination of the coefficients for various transformers having different winding structures, and this provides a cause of mis-setting the coefficients.

(c) The coefficients cannot be previously determined when, for example, the dimensions of windings of a transformer are unknown.

SUMMARY OF THE INVENTION

It is an object of the present invention to provide a digital type transformer protection system which is freed from the prior art defects pointed out above and in which physical constants of known values peculiar to a transformer to be protected are only used as coefficients of computation formulas, so that an internal fault of the transformer can be detected at a high speed and with high sensitivity to ensure accuracy of fault detection.

In the present invention which attains the above object, a transformer circuit is regarded as being equivalent to a multiterminal network which is expressed by admittance equations. Discovered as a result of a detailed analysis are the fact that transfer admittances of a transformer observed at the instant of flow of a magnetizing inrush current do not differ substantially from those observed in a sound state and the fact that driving point admittances or shunt admittances derived from the driving-point admittances observed in the event of occurrence of an internal fault differ from those observed at the instant of flow of the magnetizing inrush current. In the present invention, the above facts are noted for identifying occurrence of an internal fault.

More precisely, transfer admittances of a transformer are previously stored in a memory, and, on the basis of sampled terminal voltages, sampled terminal currents and the stored transfer admittances, driving point admittances are computed from admittance equations, so that the presence or absence of an internal fault can be identified by reference to the resultant computed values.

The transfer admittances are computed on the basis of leakage inductances of the transformer. The leakage inductances can be accurately computed from the structure of transformer windings in the stage of designing the transformer, and they have known values provided by the result of measurement on the assembled transformer.

DESCRIPTION OF THE PREFERRED EMBODIMENTS

Figure 1:
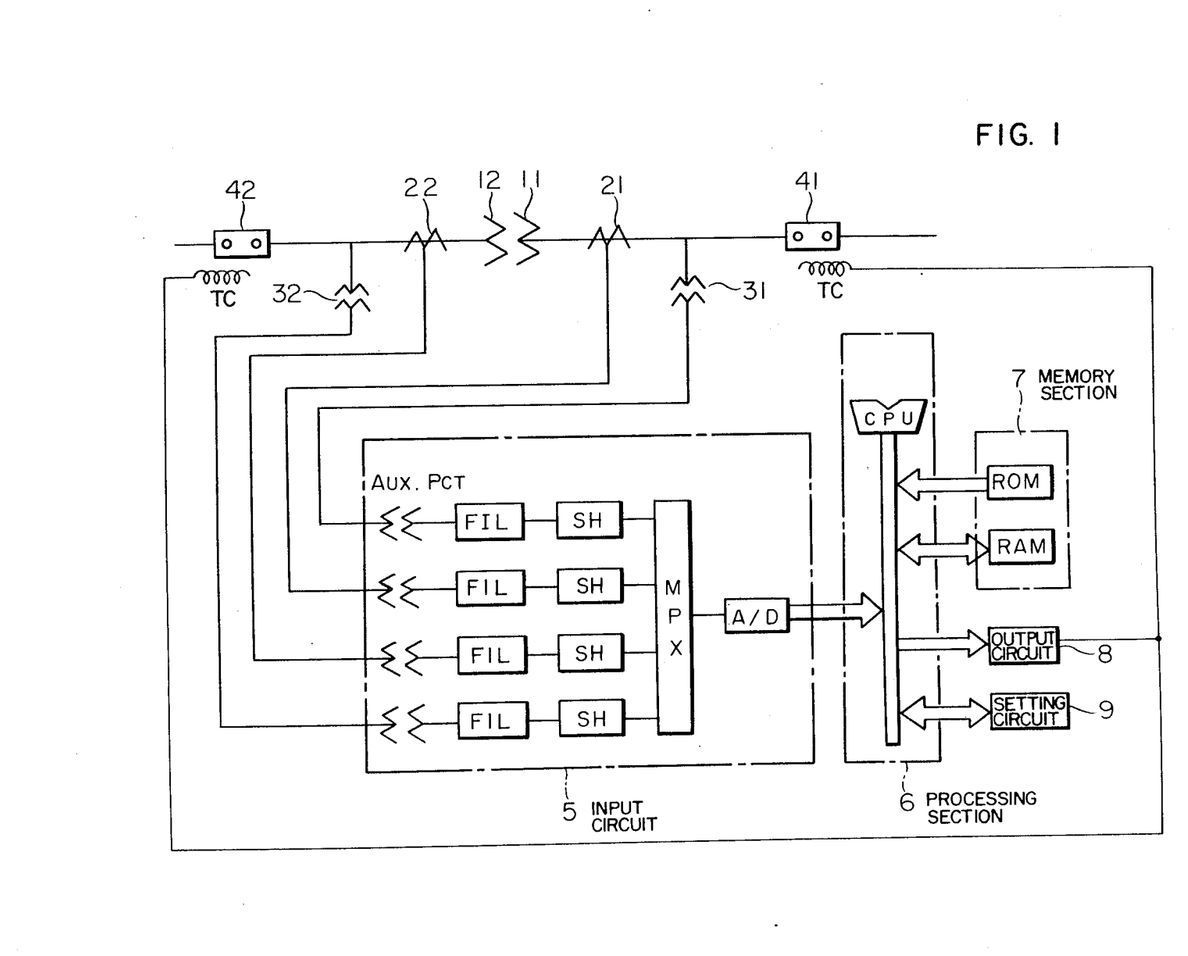
FIG. 1 shows schematically the basic structure of a computer used in an embodiment of the transformer protection system according to the present invention.
Figure 2:
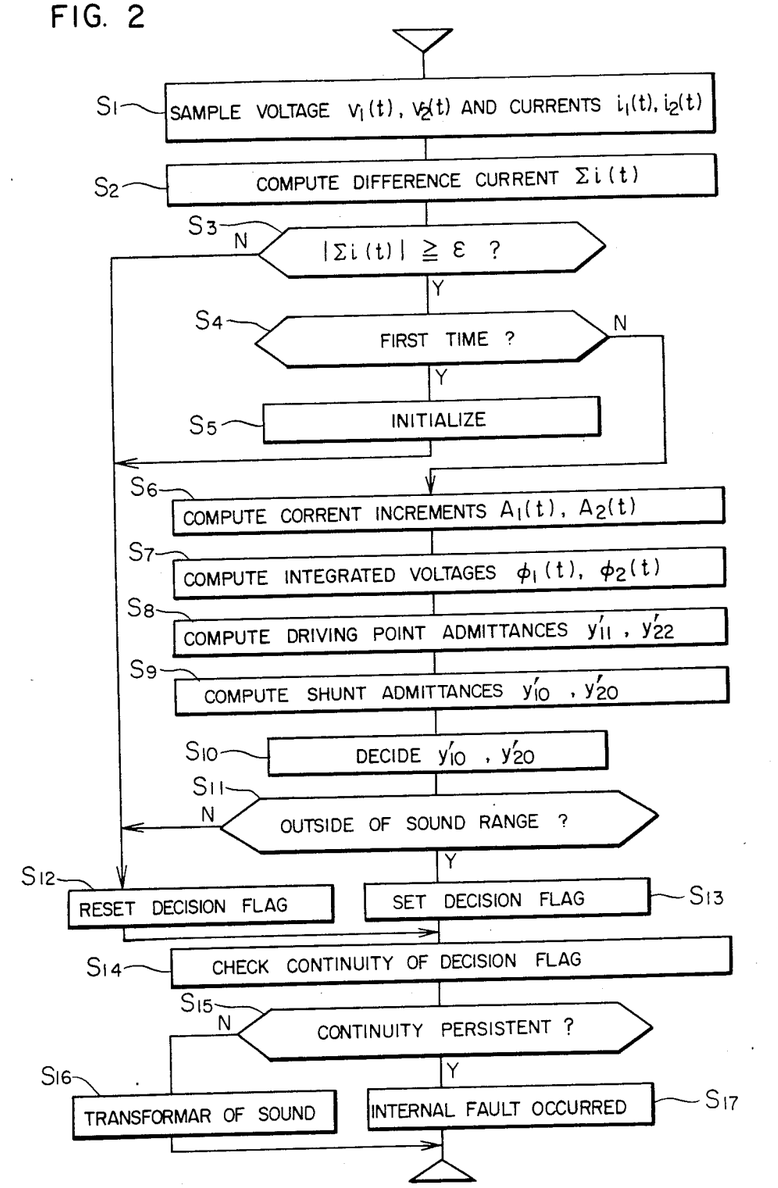
FIG. 2 is a flow chart of arithmetic operations made in the present invention.

The basic structure of a computer used in an embodiment of the transformer protection system according to the present invention is shown in FIG. 1 together with a main circuit of a transformer to be protected. FIG. 2 is a flow chart of arithmetic operations made in a present invention.

In FIG. 1, the reference numerals 11, 12; 21, 22; 31, 32; and 41, 42 designate a primary winding and a secondary winding of a transformer to be protected; a primary-side current transformer and a secondary-side current transformer; a primary-side potential transformer and a secondary-side potential transformer; and a primary-side circuit breaker and a secondary-side circuit breaker, respectively. A computer includes an input circuit 5, a processing section 6, a memory section 7, a digital output circuit 8 and a coefficient setting circuit 9. The input circuit 5 includes auxiliary potential and current transformers Aux. PCT provided for level conversion of the main circuit voltage and current, filters FIL for removing higher harmonic components unnecessary for protection of the transformer, sample/holders SH for sampling and holding instantaneous input values, a multiplexer MPX, and an analog/digital converter A/D to which the outputs of the sample/holders SH are sequentially applied through the multiplexer MPX. The processing section 6 includes a central processing unit CPU executing control functions and arithmetic operations, a data bus and an address bus. The memory section 7 includes a ROM (read-only memory) storing a control program and a RAM (random access memory) storing data. It is also possible to provide a writable non-volatile memory (not shown), for example, a semiconductor non-volatile memory used for storage, alteration, etc. of coefficients. The digital output circuit 8 generates digital output signals used for display of the results of arithmetic operations and decisions, and also a trip enabling signal which is applied to a circuit-breaker trip circuit (not shown) for allowing the circuit-breaker to be tripped. The coefficient setting circuit 9 sets and displays coefficients of equations, relay settings, etc. However, this setting circuit 9 may display and output the results of arithmetic operations and decisions.

Before describing the flow chart of arithmetic operations shown in FIG. 2, equations of transformer admittances and a method of computing the admittances will be described with reference to FIGS. 3 and 4.

Figure 3:
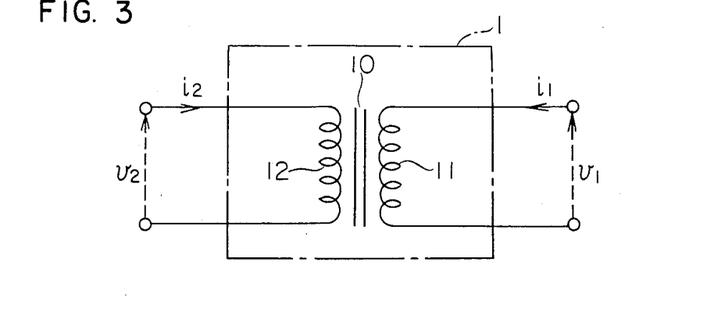
FIG. 3 shows schematically the structure of a two-winding transformer.

FIG. 3 shows schematically the structure of a two-winding transformer 1 to be protected. The two-winding transformer 1 includes an iron core 10, a primary winding 11 and a secondary winding 12. In FIG. 3, symbols $i_1$ and $i_2$ indicate a primary current and a secondary current respectively, and symbols $v_1$ and $v_2$ indicate a primary voltage and a secondary voltage respectively.

The two-winding transformer 1 shown in FIG. 3 is now regarded as a four-terminal network. The relation between the voltages $v_1$, $v_2$ and the currents $i_1$, $i_2$ is generally expressed by the following admittance equation (3) independently of the operating condition of the transformer 1, such as normal operating state, or an instance of magnetizing inrush current flowing, or an occurrence of internal fault:

$$\begin{bmatrix} i_1 \\ i_2 \end{bmatrix} = \begin{bmatrix} y_{11}' & y_{12} \\ y_{21} & y_{22}' \end{bmatrix} \begin{bmatrix} \int v_1 dt \\ \int v_2 dt \end{bmatrix} \quad (3)$$

The admittance matrix given by the equation (3) is a symmetrical matrix, and there are three independent admittance elements $y_{12}$ $(=y_{21})$, $y_{11}'$ and $y_{22}'$. The non-diagonal elements $y_{12}$ and $y_{21}$ in the admittance matrix are called transfer admittances, while the diagonal elements $y_{11}'$ and $y_{22}'$ are called driving point admittances.

In the present invention, the transfer admittances and driving point admittances are handled as known values and unknown values respectively. Therefore, a dash is put to the driving point admittances so that the driving point admittances can be easily distinguished from the transfer admittances. In the later description, a dash is put to admittances which are handled as unknown values.

From the equation (3), the driving point admittances $y_{11}'$ and $y_{22}'$ are given by the following equations (4):

$$\begin{cases} y_{11}' = \{i_1 - y_{12}\int v_2 dt\}/v_1 dt \\ y_{22}' = \{i_2 - y_{21}\int v_1 dt\}/v_2 dt \end{cases} \quad (4)$$

Figure 4:
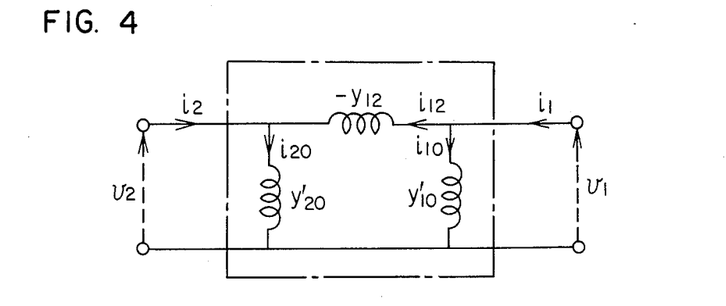
FIG. 4 shows an equivalent circuit of the transformer structure shown in FIG. 3.

FIG. 4 shows an equivalent circuit satisfying the equation (3). The fact that the equivalent circuit shown in FIG. 4 satisfies the admittance equation (3) need not be explained since it belongs to the basics of the electrical circuit theory.

In FIG. 4, symbols $y_{10}'$ and $y_{20}'$ designate shunt admittances parallel to the primary and secondary terminals respectively, and these shunt admittances are generally related to the transfer admittances and driving point admittances as expressed by the following equations (5):

$$\begin{cases} y_{10}' = y_{11}' + y_{12} \\ y_{20}' = y_{21} + y_{22}' \end{cases} \quad (5)$$

The characters of the individual admittances will now be described on the assumption that the voltages and currents shown in FIG. 4 have values based on arbitrarily selected, reference numbers of turns of the windings.

When the two-winding transformer is in its sound state or free from an internal trouble, the equivalent circuit shown in FIG. 4 is that of a $\pi$ network commonly known in the art. As is well known, $-y_{12}$ corresponds to a leakage inductance, while $y_{10}'$ and $y_{20}'$ correspond to excitation inductances. That is, $y_{12}$ is expressed as $$y_{12} = -1/L_{12} \quad (6)$$

where $L_{12}$ is a primary-secondary leakage inductance computed in terms of the reference numbers of turns of the two-winding transformer 1 shown in FIG. 3. It is empirically known that the value of the leakage inductance $L_{12}$ computed on the basis of the dimensions of the primary and secondary windings with no iron core therebetween coincides well with the value of the leakage inductance $L_{12}$ measured in the presence of the iron core 10. Thus, since the value of the leakage inductance $L_{12}$ remains substantially constant regardless of how much the iron core 10 is excited or magnetized, the value of the transfer admittance $y_{12}$ remains also substantially constant regardless of the excited state of the iron core 10, that is, whether the transformer 1 operates in its steady state or a magnetizing inrush current flows.

The shunt admittances $y_{10}'$ and $y_{20}'$ change depending on the excited state of the iron core 10. When the transformer 1 operates in its steady state, the exciting current is generally negligible as compared to the load current. Therefore, the following relation holds:

$$y_{10}' \approx y_{20}' \approx 0 \quad (7)$$

Since the state of the transformer when the magnetizing inrush current flows is equivalent to the state of the transformer with no iron core, the shunt admittances $y_{10}'$ and $y_{20}'$ have constant values determined by the self-inductances and mutual inductances of the windings with no iron core.

On the other hand, in the event of occurrence of an internal fault such as a fault of short-circuit in one of the windings, the admittance values differ from those computed in a sound state of the transformer, that is, when the transformer operates in its steady state or when a magnetizing inrush current flows in the transformer. According to the usual way of thinking on an equvalent circuit, the values of $y_{10}'$ and $y_{20}'$ are, for example, as follows: When the primary winding 11 in FIG. 3 is wholly short-circuited, $$\begin{cases} y_{10}' \approx \infty \\ y_{20}' \approx 0 \end{cases} \quad (8)$$

On the other hand, when the secondary winding 12 is wholly short-circuited, $$\begin{cases} y_{10}' \approx 0 \\ y_{20}' \approx \infty \end{cases} \quad (9)$$

In both these two cases, the transfer admittance $y_{12}$ does not change and is the same as that of the sound state.

The above discussion will now be summarized:

(a) The transfer admittance $y_{12}$ remains substantially constant irrespective of whether the transformer is operating in its sound state or a magnetizing inrush current flows in the transformer or an internal fault has occurred in the transformer. Therefore, the accurate value of the transfer admittance $y_{12}$ can be computed on the basis of the known leakage inductance $L_{12}$ and previously stored in a memory.

(b) The values of the shunt admittances $y_{10}'$ and $y_{20}'$ observed in the case of flow of a magnetizing inrush current differ from those observed in the case of occurrence of an internal fault. Therefore, the values of the shunt admittances $y_{10}'$ and $y_{20}'$ can be utilized for the distinction between the two states.

These admittance values will be described in further detail in a later description directed to a three-winding transformer.

How to determine the values of admittances based on the sampled values of currents and voltages will now be dscribed. Voltages and currents are suffixed with (t) to show that they are functions of time t. The equations (4) include members integrated with time t. Therefore, when the integration starting time t is set at $t=t_0$, transformation of the equations (4) provides the following equations (10):

$$y_{11}' = \left[\{i_1(t) - i_1(t_0)\} - y_{12} \int_{t_0}^{t} v_2(t)dt\right] / \int_{t_0}^{t} v_1(t)dt \quad (10)$$

$$y_{22}' = \left[\{i_2(t) - i_2(t_0)\} - y_{21} \int_{t_0}^{t} v_1(t)dt\right] / \int_{t_0}^{t} v_2(t)dt$$

In the equations (10), $i_1(t_0)$ and $i_2(t_0)$ correspond to integration constants. The trapezoidal formula is used in the integration by way of example. The results of the integration are as follows:

$$\begin{cases} \int_{t_0}^{t} v_1(t)dt = \phi_1(t) \\ \qquad = \phi_1(t - \Delta t) + \frac{\Delta t}{2}\{v_1(t) + v_1(t - \Delta t)\} \\ \int_{t_0}^{t} v_2(t)dt = \phi_2(t) \\ \qquad = \phi_2(t - \Delta t) + \frac{\Delta t}{2}\{v_2(t) + v_2(t - \Delta t)\} \end{cases} \quad (11)$$

where $\Delta t$ is the time interval of sampling, and the initial values of integration are as follows:

$$\phi_1(t_0) = \phi_2(t_0) = 0 \quad (12)$$

Current increments $A_1(t)$ and $A_2(t)$ are expressed as follows:

$$\begin{cases} A_1(t) = i_1(t) - i_1(t_0) \\ A_2(t) = i_2(t) - i_2(t_0) \end{cases} \quad (13)$$

Then, the driving point admittances $y_{11}'$ and $y_{22}'$ are given by the following equations (14):

$$\begin{cases} y_{11}' = \{A_1(t) - y_{12}\phi_2(t)\}/\phi_1(t) \\ y_{22}' = \{A_2(t) - y_{21}\phi_1(t)\}/\phi_1(t) \end{cases} \quad (14)$$

Substitution of the values of the driving point admittances $y_{11}'$ and $y_{22}'$ into the equation (5) provides the values of the shunt admittances $y_{10}'$ and $y_{20}'$.

The foregoing description has explained the outline of the admittance equations and the method of admittance computation in the present invention. Steps of the flow chart shown in FIG. 2 will now be described in detail.

First, in a step $S_1$, voltages $v_1(t)$, $v_2(t)$ and currents $i_1(t)$, $i_2(t)$ at time t are sampled. The values of the voltages and currents are converted to equivalents in any of the primary and secondary windings.

In a step $S_2$, the difference current $\Sigma i(t)$ is computed according to the following equation (15);

$$\Sigma i(t) = i_1(t) + i_2(t) \quad (15)$$

In a step $S_3$, judgment is made as to whether the absolute value of $\Sigma i(t)$ is larger than or equal to a predetermined detection level $\epsilon$. When the result of judgment process that $|\Sigma i(t)| < \epsilon$, the step $S_3$ is followed by a step $S_{12}$. On the other hand, when the result of judgment proves that $|\Sigma i(t)| \geq \epsilon$, it indicates a flow of magnetizing inrush current or occurrence of an internal fault, and the step $S_3$ is followed by a step $S_4$.

In the step $S_4$, judgment is made as to whether or not the relation $|\Sigma i(t)| \geq \epsilon$ is attained for the first time. When the result of judgment proves that the above relation has been attained also in a preceding flow, the step $S_4$ is followed by a step $S_6$. On the other hand, when the result of judgment proves that the above relation is attained for the first time, the step $S_4$ is followed by a step $S_5$. When an internal trouble has occurred, and the polarity of $\Sigma i(t)$ is going to be inverted, the polarity of $\Sigma i(t)$ may be negative, and the absolute value of $\Sigma i(t)$ may be equal to or larger than $\epsilon$ in the step $S_4$ in the preceding flow, while the polarity of $\Sigma i(t)$ may be positive, and the absolute value of $\Sigma i(t)$ may be equal to or larger than $\epsilon$ in the step $S_4$ in the present flow. In such a case, the polarity inversion of $\Sigma i(t)$ may be detected to decide that the relation $|\Sigma i(t)| \geq \epsilon$ holds for the first time.

In the step $S_5$, voltage and current values are initialized. First, the values of currents $i_1(t_0)$ and $i_2(t_0)$ at time $t = t_0$ are stored. Then, the areas for storing $\phi_1(t_0)$ and $\phi_2(t_0)$, which are integral values of voltages $v_1(t)$ and $v_2(t)$ in the equations (11), are cleared. After the initialization, the step $S_5$ is followed by the step $S_{12}$.

In a step $S_6$, the current increments $A_1(t)$ and $A_2(t)$ are computed according to the equations (13), and, in a step $S_7$, the integral values $\phi_1(t)$ and $\phi_2(t)$ of the voltages $v_1(t)$ and $v_2(t)$ are computed according to the equations (11).

In a step $S_8$, the driving point admittances $y_{11}'$ and $y_{22}'$ are computed according to the equations (14), and, in a step $S_9$, the shunt admittances $y_{10}'$ and $y_{20}'$ are computed according to the equations (5).

The shunt admittances $y_{10}'$ and $y_{20}'$ are then decided in steps $S_{10}$ to $S_{13}$. As described already, the values of $y_{10}'$ and $y_{20}'$ measured at the instant of appearance of a magnetic inrush current do not substantially change or remain substantially constant. Therefore, their approximate values are previously estimated, and, for each of them, predetermined reference values larger and smaller than the estimated value respectively are previously stored. For example, reference values $\alpha_1$ and $\beta_1$ respectively larger and smaller than the estimated value of the shunt admittance $y_{10}'$ measured at the instant of appearance of the magnetic inrush current are previously stored. Similarly, reference values $\alpha_2$ and $\beta_2$ are previously stored in the case of the shunt admittance $y_{20}'$ too. Decision formulas (16) to (19) used for the decision of the shunt admittances $y_{10}'$ and $y_{20}'$ are as follows:

$$y_{10}' \leq \beta_1 \quad (16)$$

$$y_{10}' \geq \alpha_1 \quad (17)$$

$$y_{20}' \leq \beta_2 \quad (18)$$

$$y_{20}' \geq \alpha_2 \quad (19)$$

The shunt admittances $y_{10}'$ and $y_{20}'$ are decided in the step $S_{10}$ by reference to the decision formulas (16) to (19). When at least one of the decision formulas (16) to (19) is satisfied, the computer decides in the step $S_{11}$ that the transformer is operating outside of its sound range, and a decision flag is set in the step $S_{13}$. On the other hand, when all of the decision formulas (16) to (19) are not satisfied, the computer decides in the step $S_{11}$ that the transformer is operating in its sound range, and the decision flag is reset in the step $S_{12}$. It is apparent that all of the decision formulas (16) to (19) are not necessarily essentially required for deciding as to whether or not the transformer is operating in the sound range. Part of these decision formulas may be enough to detect all of internal faults which lead to an unsound operation of the transformer. A practical method will be described in further detail in a later description directed to a three-winding transformer.

In order that occurrence of an internal fault can be detected without failure and the circuit-breaker trip enabling signal can be generated, continuity of the decision flag is checked in steps $S_{14}$ and $S_{15}$. There are various methods for checking the continuity of the decision flag, as follows:

(a) When the decision flag is set a plurality of concecutive times, for example, two or three consecutive times, the computer decides that the continuity of the decision flag persists.

(b) When the decision flag is set a plurality of times within a predetermined period of time, for example, within one cycle of the main circuit frequency, the computer decides that the continuity of the decision flag persists even if the flag is set discontinuously.

(c) Once the persistence of the continuity of the decision flag has been decided, the continuity decision is kept alive at least for a predetermined period of time, for example, a period of time corresponding to one cycle of the main circuit frequency.

When the persistence of the continuity of the decision flag is decided in the step $S_{15}$, the computer decides in a step $S_{17}$ that an internal fault has occurred, and the circuit-breaker trip enabling signal is generated. When, on the other hand, the result of decision in the step $S_{15}$ is No, the computer decides that the transformer is sound or fault-free.

The trip enabling signal allows a circuit-breaker to be tripped independently of or dependent of the condition of another fault detecting element.

In the flow shown in FIG. 2, the presence or absence of an internal fault is decided on the basis of the values of the shunt admittances $y_{10}'$ and $y_{20}'$. However, the decision may be made on the basis of the values of the driving point admittances $y_{11}'$ and $y_{22}'$ to attain the equivalent effect. In such a case, $y_{10}'$ and $y_{20}'$ need not be computed.

The foregoing description has clarified the details of the arithmetic operation flow shown in FIG. 2. For the computation of the driving point admittances, the division shown in the equations (14) is required. However, such division is not required in a modification which will be described below. For the sake of simplicity, the suffixes (t) attached to the voltages and currents are omitted in the description of the modification.

By substituting the values of the driving point admittances $y_{11}'$ and $y_{22}'$ given by the equations (4) into the equations (5) and rearranging the equations (5), the following equations (20) and (21) are obtained:

$$y_{10}' = [i_1 - \{-y_{12}\int v_1 dt + y_{12}\int v_2 dt\}]/\int v_1 dt \qquad (20)$$

$$y_{20}' = [i_2 - \{-y_{21}\int v_1 dt + y_{21}\int v_2 dt\}]/\int v_2 dt \qquad (21)$$

Then, the current $i_{10}$ of the shunt admittance $y_{10}'$ is computed from the equivalent circuit of FIG. 4, as expressed by the following equation (22):

$$\begin{aligned} i_{10} &= i_1 - i_{12} \\ &= i_1 - \{-y_{12}\int(v_1 - v_2)dt\} \\ &= i_1 - \{-y_{12}\int v_1 dt + y_{12}\int v_2 dt\} \end{aligned} \qquad (22)$$

Similarly, the current $i_{20}$ of the shunt admittance $y_{20}'$ is computed as follows:

$$i_{20} = i_2 - \{y_{12}\int v_1 dt - y_{12}\int v_2 dt\} \qquad (23)$$

It will be seen that the numerator in the right-hand members of the equation (20) is equal to the equation (22), and that of the right-hand members of the equation (21) is equal to the equation (23). Therefore, the shunt admittances $y_{10}'$ and $y_{20}'$ are expressed as follows:

$$y_{10}' = i_{10}/\int v_1 dt \qquad (24)$$

$$y_{20}' = i_{20}/\int v_2 dt \qquad (25)$$

Now, the decision formula (16) is taken as an example of the admittance decision formula. By substituting the value of $y_{10}'$ given by the equation (24) into the formula (16) and transforming the formula (16), the following formula (26) is obtained:

$$C_1/\int v_1 dt \leq 0 \qquad (26)$$

where $$\begin{aligned} C_1 &= i_{10} - \beta_1 \int v_1 dt \\ &= i_1 - \{(\beta_1 - y_{12})\int v_1 dt + y_{12}\int v_2 dt\} \end{aligned} \qquad (27)$$

Therefore, decision which is entirely the same as that based on the formula (16) can be made according to the following formulas (28):

$$\begin{cases} C_1 \leq 0 \text{ when } \int v_1 dt > 0 \\ C_1 \geq 0 \text{ when } \int v_1 dt < 0 \end{cases} \qquad (28)$$

The same applies also to the other decision formulas. The above manner of computation and decision does not include multiplication and division between the variables and is thus quite effective for simplifying the computation formulas and shortening the time required for computation.

In another modification, an equation of differential form is used as the admittance equation. The admittance equation (3) of integral form is rewritten into that of differential form, as expressed by the following equation (29):

$$\begin{bmatrix} \dfrac{di_1}{dt} \\ \dfrac{di_2}{dt} \end{bmatrix} = \begin{bmatrix} y_{11}' & y_{12} \\ y_{21} & y_{22}' \end{bmatrix} \begin{bmatrix} v_1 \\ v_2 \end{bmatrix} \qquad (29)$$

The admittance matrix given by the equation (29) is entirely the same as that given by the equation (3). Thus, the characters of the admittance values in the two-winding transformer described above and those of the admittance values in a three-winding transformer described later are equally applicable to the admittance matrices given by these equations. Therefore, employment of the admittance equation (29) of differential form can basically attain the effect similar to that exhibited by the use of the admittance equation (3) of integral form. The method of computation and decision on the basis of the admittance equation (29) of differential form will not be especially described herein because it can be easily derived from the aforementioned procedure based on the admittance equation (3) of integral form.

In a transformer commonly used in an electric power system, its winding resistance is low and has been ignored in the foregoing description. However, in the case of a transformer of a relatively small capacity where its winding resistance is not negligible, the primary voltage $v_1$, for example, may be replaced by $(v_1 - r_1 i_1)$ in the computation, where $r_1$ is the resistance of the primary winding.

While an embodiment of the present invention has been described with reference to an application of the present invention to a two-winding transformer, the present invention is applicable to any other transformer structures with higher ability in detection of an internal fault. An application of the present invention to a three-winding transformer will now be described in detail, by way of example.

Figure 5:
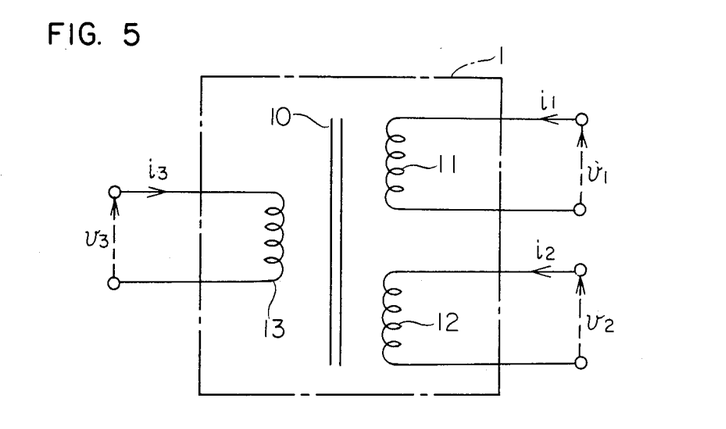
FIG. 5 shows schematically the structure of a three-winding transformer.

FIG. 5 shows schematically the structure of a three-winding transformer to be protected. The three-winding transformer 1 includes an iron core 10, a primary winding 11, a secondary winding 12 and a tertiary winding 13. In FIG. 5, symbols $i_1$, $i_2$ and $i_3$ indicate a primary current, a secondary current and a tertiary current respectively, and symbols $v_1$, $v_2$ and $v_3$ designate a primary voltage, a secondary voltage and a tertiary voltage respectively. As in the case of the two-winding transformer, the following admittance equation (30) holds:

$$\begin{bmatrix} i_1 \\ i_2 \\ i_3 \end{bmatrix} = \begin{bmatrix} y_{11}' & y_{12} & y_{13} \\ y_{21} & y_{22}' & y_{23} \\ y_{31} & y_{32} & y_{33}' \end{bmatrix} \begin{bmatrix} \int v_1 dt \\ \int v_2 dt \\ \int v_3 dt \end{bmatrix} \quad (30)$$

The admittance matrix given by the equation (30) is a symmetrical matrix. In the matrix, the non-diagonal elements $y_{12}(=y_{21})$, $y_{13}(=y_{31})$ and $y_{23}(=y_{32})$ represent transfer admittances, while the diagonal elements $y_{11}'$, $y_{22}'$ and $y_{33}'$ represent driving point admittances.

From the equation (30), the driving point admittances $y_{11}'$, $y_{22}'$ and $y_{33}'$ are given by the following equations (31):

$$y_{11}' = \{i_1 - (y_{12} \int v_2 dt + y_{13} \int v_3 dt)\} / \int v_1 dt$$

$$y_{22}' = \{i_2 - (y_{21} \int v_1 dt + y_{23} \int v_3 dt)\} / \int v_2 dt$$

$$y_{33}' = \{i_3 - (y_{31} \int v_1 dt + y_{32} \int v_2 dt)\} / \int v_3 dt \quad (31)$$

Figure 6:
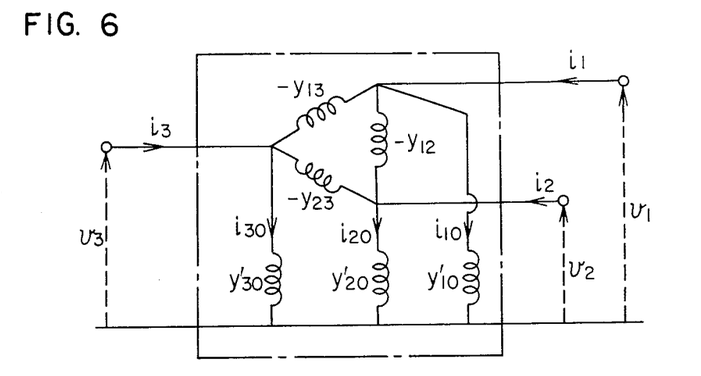
FIGS. 6 to 8 show equivalent circuits of the transformer structure shown in FIG. 5.

FIG. 6 shows an equivalent circuit of the transformer structure shown in FIG. 5, and shunt admittances $y_{10}'$, $y_{20}'$ and $y_{30}'$ are given by the following equations (32):

$$y_{10}' = y_{11}' + y_{12} + y_{13}$$

$$y_{20}' = y_{21} + y_{22}' + y_{23} \quad (32)$$

$$y_{30}' = y_{31} + y_{32} + y_{33}'$$

On the assumption that the voltages and currents shown in FIG. 6 have values based on arbitrarily selected, reference numbers of turns of the windings, the transfer admittances in a steady operating state of the transformer are first computed on the basis of leakage inductances.

Figure 7:
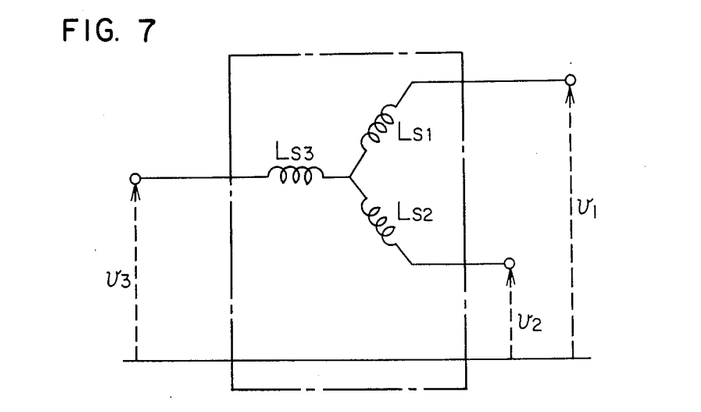
Figure 8:
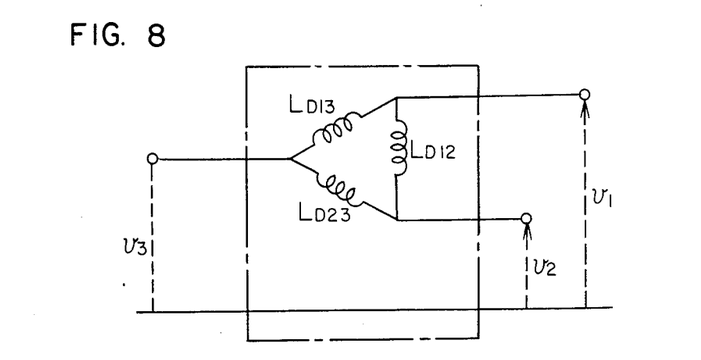

It is supposed that $L_{12}$, $L_{13}$ and $L_{23}$ represent a primary-secondary leakage inductance, a primary-tertiary leakage inductance and a secondary-tertiary leakage inductance, respectively. Generally, the three-winding transformer operating in a steady state is expressed by a star type equivalent circuit as shown in FIG. 7 or a delta type equivalent circuit as shown in FIG. 8. As is commonly known, the values of individual elements $L_{S1}$, $L_{S2}$ and $L_{S3}$ of the star type equivalent circuit are given by the following equations (33) respectively:

$$L_{S1} = (L_{12} + L_{13} - L_{23})/2$$

$$L_{S2} = (L_{12} - L_{13} + L_{23})/2 \quad (33)$$

$$L_{S3} = (-L_{12} + L_{13} - L_{23})/2$$

When the star type equivalent circuit shown in FIG. 7 is converted into the delta type equivalent circuit shown in FIG. 8, the values of individual elements of the latter equivalent circuit are given by the following equations (34) respectively:

$$L_{D12} = L_{SS}/L_{S3}$$

$$L_{D13} = L_{SS}/L_{S2} \quad (34)$$

$$L_{D23} = L_{SS}/L_{S1}$$

where $$L_{SS} = L_{S1} L_{S2} + L_{S1} L_{23} + L_{S2} L_{S3}$$

FIG. 8 will be compared with FIG. 6. In the steady operating state of the transformer, $y_{10}' = y_{20}' = y_{30}' = 0$. Therefore, the transfer admittances $y_{12}$, $y_{13}$ and $y_{23}$ are expressed as follows:

$$y_{12} = -1/L_{D12}$$

$$Y_{13} = -1/L_{D13} \quad (35)$$

$$y_{23} = -1/L_{D23}$$

Therefore, these transfer admittances can be previously computed on the basis of the leakage inductances and stored as in the case of the two-winding transformer.

Generally, in the case of an N-winding transformer, its admittance matrix is an N x N symmetrical matrix, and the number of independent transformer admittances is $N(N-1)/2$ which is equal to the number of combinations of the N windings. These transfer admittances can be previously computed on the basis of leakage inductances the number of which is equal to that of the transfer admittances. There are generally several methods for computing the transfer admittances. However, the method for computing the transfer admittances is not especially limited in the present invention, and no description of the method will be given herein.

In order to avoid the complexity of previous computation of the transfer admittances on the basis of the leakage inductances, pre-processing is effective in which the computer stores a program for computing the transfer admittances on the basis of leakage inductances determined by the coefficient setting circuit 9 shown in FIG. 1. This pre-processing is also effective for preventing mis-setting of the coefficients.

Figure 9:
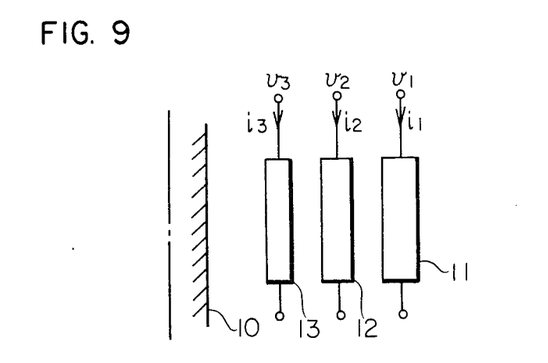
FIG. 9 shows the arrangement of three windings of a three-winding transformer.
Figure 10:
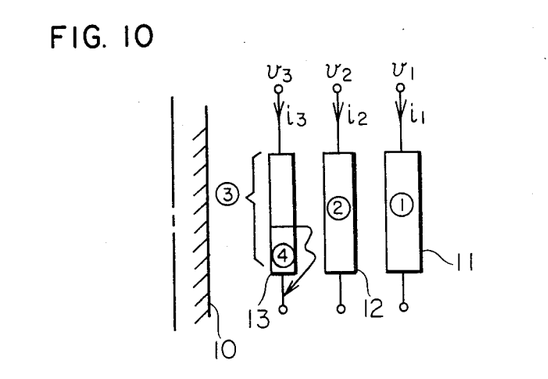
FIG. 10 is a view similar to FIG. 9 but showing a trouble occurred in one of the windings.
Figure 11:
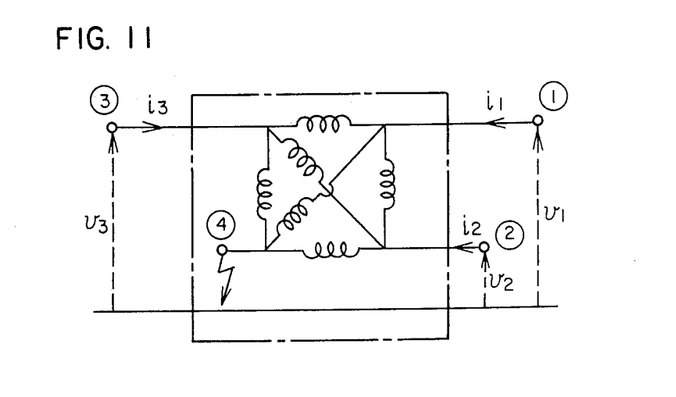
FIG. 11 shows an equivalent circuit of FIG. 10.

FIG. 9 shows schematically the structure of a three-winding transformer including an iron core 10, a primary winding 11, a secondary winding 12 and a tertiary winding 13. A manner of computation of various admittances of such a transformer will be described. The state of the transformer when a magnetizing inrush current flows is equivalent to the state of the transformer with no iron core. Therefore, in such a state of the transformer, the values of various admittance elements in the equivalent circuit shown in FIG. 6 can be computed from an inverse matrix of the matrix of the self-inductances and mutual inductances of the windings in the absence of the iron core. A method of computing the values of the admittance elements in the event of occurrence of a fault of local short-circuit in a tertiary winding 13 shown in FIG. 10 will be described by way of example. In FIG. 10, the same reference numerals are used to designate the same parts appearing in FIG. 9. When such a fault of local short-circuit occurs, the transformer is turned into a four-winding transformer, and its equivalent circuit differs generally from that shown in FIG. 6 and has a form as shown in FIG. 11. The values of six admittance elements in FIG. 11 can be computed on the basis of the values of six leakage inductances in the four-winding transformer. The terminal ④ in FIG. 11 corresponds to the short-circuited winding portion ④ in FIG. 10. Since the potential at the terminal ④ in FIG. 11 is zero, it can be seen that FIG. 11 is topologically the same as FIG. 6. Thus, when such an internal fault occurs, the values of the admittance elements in the equivalent circuit of FIG. 6 can be computed on the basis of the values of the leakage inductances in the four-winding transformer.

Figure 12:
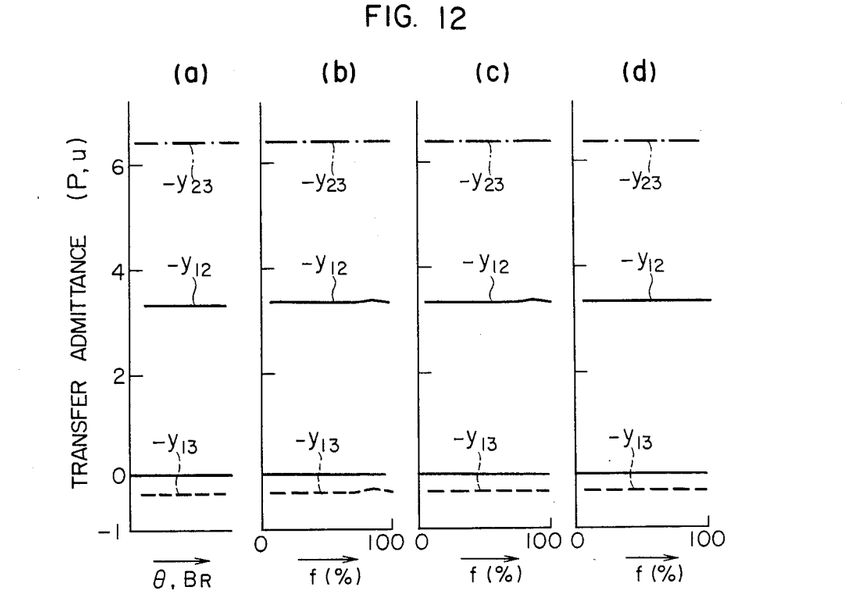
FIGS. 12 and 13 show the admittance characteristics of the three-winding transformer shown in FIG. 9.

FIG. 12 shows the computed values of transformer admittances in various states as described above. In FIG. 12, (a), (b), (c) and (d) correspond to the instant of flow of a magnetizing inrush current, occurrence of a short-circuit fault in the primary winding, occurrence of a short-circuit fault in the secondary winding, and occurrence of a short-circuit fault in the tertiary winding, respectively. In the horizontal axis of FIG. 12(a), $\theta$ represents the phase of turning on the power supply, and $B_R$ represents the density of residual magnetic flux at the above phase. In each of the horizontal axes of FIGS. 12(b) to 12(d), f represents the percentage of the number of short-circuited turns relative to the total number of turns of the corresponding winding. It will be seen in FIG. 12(a) that the values of the transfer admittances are constant irrespective of the values of $\theta$ and $B_R$. It will be also seen in FIGS. 12(b) to 12(d) that the values of the transfer admittances are substantially constant irrespective of the location of the disabled winding and the number of short-circuited turns. That is, irrespective of whether the transformer operates in its steady state, or a magnetizing inrush current flows in the transformer, or an internal fault has occurred in the transformer, the values of the transfer admittances $y_{12}$, $y_{13}$ and $y_{23}$ are substantially constant. Thus, it is apparent that the values of the transfer admittances are preferably previously computed on the basis of the values of the leakage inductances, and the computed admittance values are stored as known coefficients.

Figure 13:
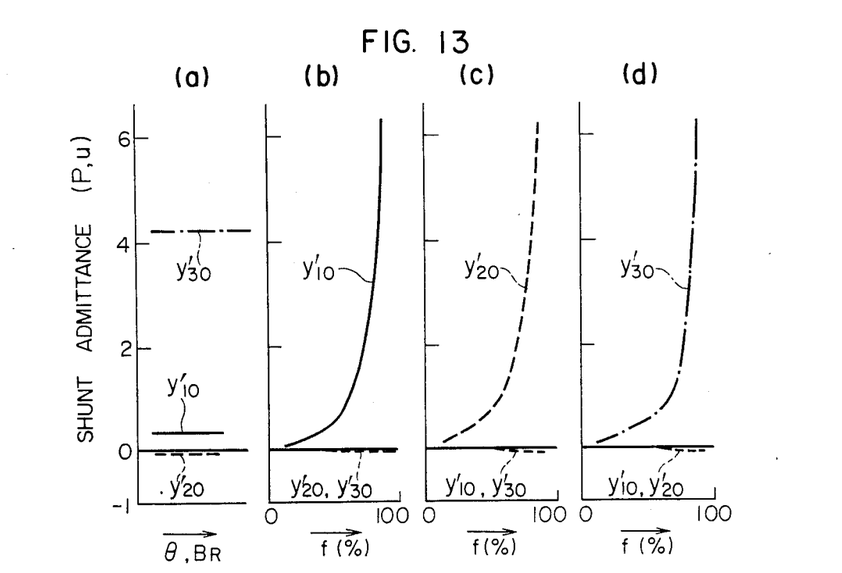

FIG. 13 shows the values of the shunt admittances computed according to the above-described method of computation for various states. In FIG. 13, (a), (b), (c) and (d) correspond to the instant of flow of a magnetizing inrush current, occurrence of a short-circuit fault in the primary winding, occurrence of a short-circuit fault in the secondary winding, and occurrence of a short-circuit fault in the tertiary winding, respectively, as in the case of FIG. 12. The horizontal axis in FIG. 13(a) represents $\theta$ and $B_R$, while those in FIGS. 13(b) to 13(d) represent f, as in the case of FIG. 12. It will be seen in FIG. 13(a) that the shunt admittance values are substantially constant irrespective of the power supply turn-on phase $\theta$ and residual flux density $B_R$. In each of FIGS. 13(b) to 13(d), the situation is entirely different from that shown in FIG. 13(a). It is thus apparent that occurrence of an internal fault can be very clearly distinguished from the occasion of magnetizing inrush current flowing by a method of decision similar to that described already for the two-winding transformer.

The relation between the transformer structure shown in FIGS. 9 and 10 and the shunt admittance characteristics shown in FIG. 13 will now be briefly discussed.

When a magnetizing inrush current flows in the transformer, the value of the shunt admittance $y_{30}'$ is largest. This is because the voltage of the tertiary winding, which is an innermost layer located near the leg of the iron core, is most predominant when the transformer is excited. The voltage of the primary winding, which is an outermost layer located near the yoke of the iron core, is next predominant, and the shunt admittance $y_{10}'$ corresponds to that voltage. The value of the shunt admittance $y_{20}'$ is nearly zero. This is because the voltage of the secondary winding, which is a layer intermediate between the tertiary winding and primary winding is least predominant for the excitation of the transformer.

On the other hand, when an internal fault or a short-circuit fault occurs in, for example, the primary winding, the value of the shunt admittance $y_{10}'$ relating to the primary winding increases only with the increase in the number of short-circuited turns, whereas the values of the other shunt admittances $y_{20}'$ and $y_{30}'$ are nearly zero a negative. This implies the fact that the method of fault detection utilizing the shunt admittances is quite excellent in that not only occurrence of an internal fault can be very clearly distinguished from the occasion of a magnetizing inrush current flowing, but also the location of a disabled winding can be identified.

The above method will now be described in further detail. The following decision formulas (36) to (41) are used in the case of the three-winding transformer and correspond to the decision formulas (16) to (19) used in the case of the two-winding transformer:

$$y_{10}' \leq \beta_1 \tag{36}$$

$$y_{10}' \geq \alpha_1 \tag{37}$$

$$y_{20}' \leq \beta_2 \tag{38}$$

$$y_{20}' \geq \alpha_2 \tag{39}$$

$$y_{30}' \leq \beta_3 \tag{40}$$

$$y_{30}' \geq \alpha_3 \tag{41}$$

The computer decides that the transformer is operating outside of its sound range when at least one of the formulas (36) to (41) is satisfied. However, all of these formulas are not necessarily essentially required. For example, in the case of the shunt admittance characteristics shown in FIG. 13, the following two decision formulas (36) and (40) may merely be required to detect all of internal faults.

$$y_{10}' \leq \beta_1 \text{ (for example, 0 p.u.)} \tag{42}$$

$$y_{30}' \leq \beta_3 \text{ (for example, 2 p.u.)} \tag{43}$$

That is, by application of the formula (43) to FIG. 13, all kinds of fault can be identified except for a fault of short-circuiting a relatively large number of turns of the tertiary winding. Also, by application of the formula (42), all kinds of faults occurred in the secondary and tertiary windings can be identified.

A method of identifying the location of a fault occurred in the windings will now be described. First, reference values $r_1$, $r_2$ pertinent to the shunt admittances $y_{10}'$, $y_{20}'$ and $y_{30}'$ respectively and larger than zero are previously stored. These reference values may be the same. Then, when the result of decision by the use of the formulas (36) to (41) described above proves that the transformer is operating outside of its sound range, judgment is made as to whether the following formulas (44) to (46) hold or not:

$$y_{10}' \geqq r_1 \tag{44}$$

$$y_{20}' \geqq r_2 \tag{45}$$

$$y_{30}' \geqq r_3 \tag{46}$$

As will be apparent from FIG. 13, troubles occurred in the primary, secondary and tertiary windings can be identified when the formulas (44), (45) and (46) are satisfied respectively. Also, the number of short-circuited turns can be estimated from the values of $y_{10}'$, $y_{20}'$ and $y_{30}'$.

The various results of decision described above are stored together with the values of $y_{10}'$, $y_{20}'$, $y_{30}'$, etc. in the coefficient setting circuit 9 shown in FIG. 1, or they are displayed on an output display, or they are stored in a predetermined area of the memory part 7 shown in FIG. 1, so that they can be delivered to the outside. This is very important to quickly and appropriately deal with and remedy an internal fault in the event of occurrence of such a trouble.

Figure 14:
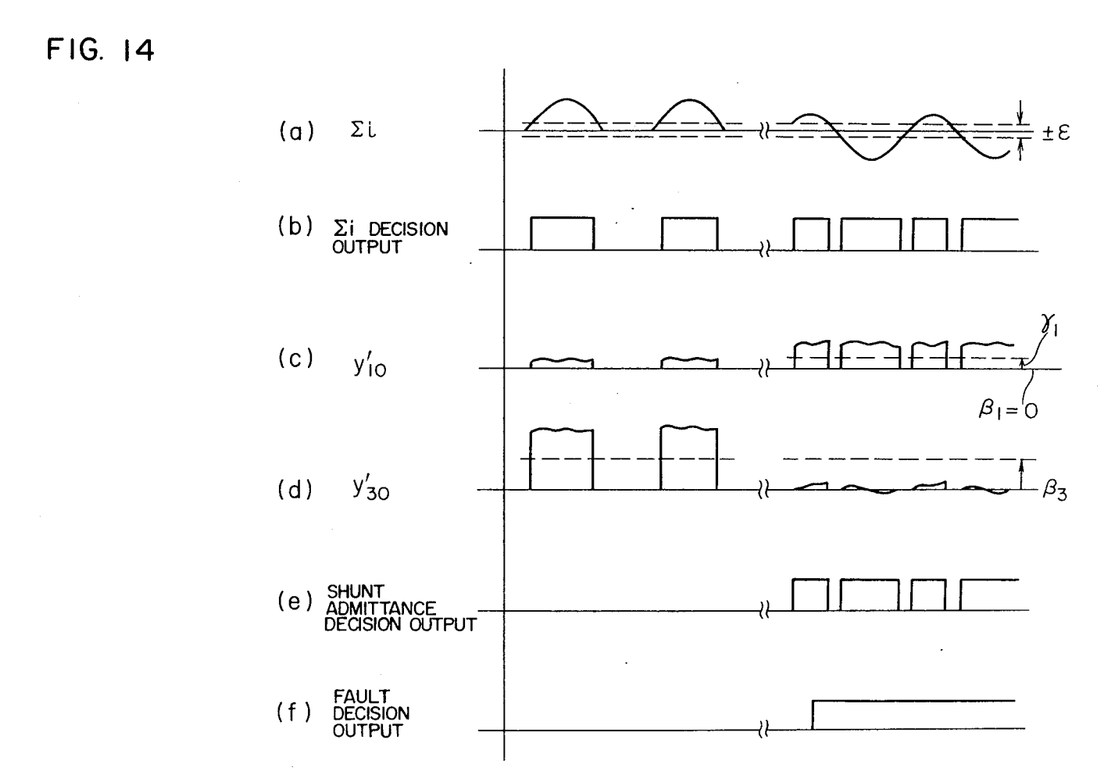
FIG. 14 is a time chart of operation of the transformer protection system embodying the present invention.

FIG. 14 is a time chart showing, by way of example, the sequence of arithmetic processnng and decision according to the present invention when an internal trouble occurs in the primary winding of the three-winding transformer, after turning-on of the power supply causes flow of a magnetic inrush current, and the operation of the transformer settles then in a steady state. In FIG. 14(a), the difference current $\Sigma i$ is computed according to the equation (15), and its absolute value is compared with the predetermined level $\epsilon$. In FIG. 14(b), a $\Sigma i$ decision output indicative of the result of comparison of the absolute value of $\Sigma i$ with $\epsilon$ is generated. In FIGS. 14(c) and 14(d), the shunt admittances $y_{10}'$ and $y_{30}'$ are computed according to the equations (32) and are compared with $\beta_1$ and $\beta_3$ respectively. In FIG. 14(e), a shunt admittance decision output indicative of whether the value of $y_{10}'$ or $y_{30}'$ satisfies the formula (42) or (43) is generated. In FIG. 14(f), a fault decision output indicative of the continuity of the decision output shown in FIG. 14(e) is generated.

When the magnetizing inrush current flows at the moment the power supply voltage is applied, the values of the shunt admittances $y_{10}'$ and $y_{30}'$ do not satisfy the formulas (42) and (43), and the decision outputs shown in FIGS. 14(e) and 14(f) are not generated.

When the internal fault occurs in the primary winding of the transformer, the value of $y_{30}'$ satisfies the formula (43) although the value of $y_{10}'$ does not satisfy the formula (42). Accordingly, the decision output shown in FIG. 14(e) is generated, and the decision output shown in FIG. 14(f) is continuously generated. Also, since the value of $y_{10}'$ satisfies the formula (44), the internal fault can be identified as that occurred in the primary winding. As will be apparent from the time chart of FIG. 14, it is one of the advantages of the present invention that an internal fault can be identified at a very high speed.

In the admittance computation described above, process of division between variables is required as seen in the equations (31). However, the same decision can be given without making such division, as in the case of the two-winding transformer described hereinbefore. For example, the following decision formulas (47) correspond to the formula (42):

$$\begin{cases} C_1 \leqq 0 \text{ when } \int v_1 dt > 0 \\ C_1 \geqq 0 \text{ when } \int v_1 dt < 0 \end{cases} \tag{47}$$

where $$\begin{aligned} C_1 &= i_{10} - \beta_1 \int v_1 dt \\ &= i_1 - [\{\beta_1 - (y_{12} + y_{13})\}\int v_1 dt + \\ & \quad y_{12} \int v_2 dt + y_{13} \int v_3 dt] \end{aligned} \tag{48}$$

The same applies also to the other decision formulas, and the same decisions can be made without the necessity for multiplication and division between the variables.

While the manner of arithmetic processing and decision for identifying occurrence of an internal fault in a three-winding transformer has been described in detail, it is apparent that this is entirely similarly applicable to transformers having four and more windings.

Depending on the transformer structure, the values of transfer admittances observed in the event of occurrence of an internal fault may be different from those observed in the state of steady operation. However, as described hereinbefore with reference to a two-winding transformer, it is empirically known that the value of the leakage inductance computed on the basis of the dimensions of the windings of a transformer with no iron core coincides well with the actually measured value of the leakage inductance, and the value of the transfer admittance observed on the occasion of a magnetizing inrush current flowing does not substantially differ from that observed when the transformer operates in its steady state. Therefore, regardless of the transformer structure, the values of the driving point admittances and shunt admittances observed on the occasion of the magnetizing inrush current flowing can be substantially accurately computed by the method of the present invention.

When an internal fault occurs in the transformer, the values of the transfer admittances differ from those observed when the transformer operates in the steady state, and errors are included in the computed values of the driving point admittances and shunt admittances. However, the values of the shunt admittances observed on the occasion of magnetizing inrush current flowing are greatly different from those observed in the event of occurrence of the internal fault, as shown in FIG. 13. Therefore, the internal fault can be exactly clearly distinguished from the flow of magnetizing inrush current despite slight errors included in the computed values of those admittances.

Figure 15:
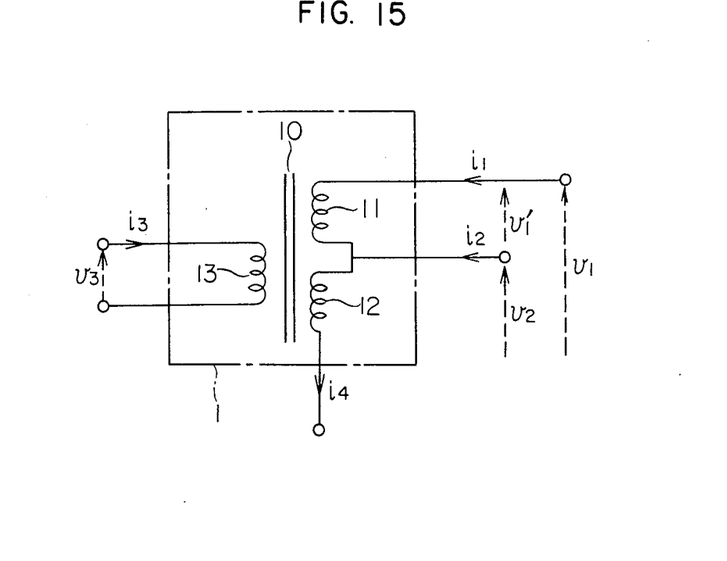
FIG. 15 shows schematically the structure of an autotransformer.

The present invention is applicable not only to transformers of separated winding type but also to an autotransformer. Application of the present invention to an autotransformer will be described with reference to FIG. 15. Referring to FIG. 15, an autotransformer 1 to be protected includes an iron core 10, a series winding 11, a common winding 12 and a tertiary winding 13. When the autotransformer 1 shown in FIG. 15 is regarded as a three-winding transformer having three windings, 11, 12 and 13, voltages and currents of the respective windings 11, 12 and 13 are $v_1'$, $v_2'$, $v_3$ and $i_1$, $i_4$ and $i_3$ as shown. On the other hand, when the autotransformer 1 is regarded as a three-winding transformer having a primary winding (11+12), a secondary winding 12 and a tertiary winding 13, voltages and currents of the respective windings are $v_1$, $v_2$, $v_3$ and $i_1$, $i_2$, $i_3$ as shown.

Figure 16:
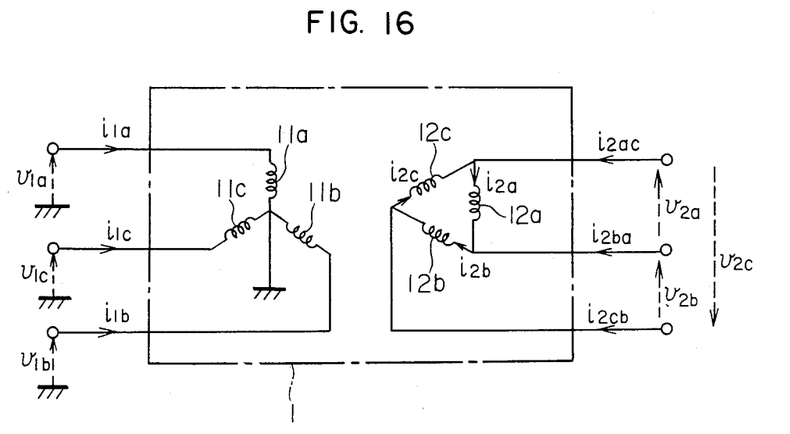
FIG. 16 shows schematically the structure of a transformer of $\lambda/\Delta$-connection.

The present invention is also applicable to a transformer of three-phase connection. FIG. 16 shows schematically the structure of a transformer of $\lambda/\Delta$ connection which includes primary windings $11a$, $11b$, $11c$ of respective phases a, b, c and secondary windings $12a$, $12b$, $12c$ of respective phases a, b, c. Voltages and currents are designated as shown, and it is supposed that each phase includes a two-winding transformer. Admittance equations are as follows:

$$\begin{bmatrix} i_{1a} \\ i_{2a} \end{bmatrix} = \begin{bmatrix} y_{11}' & y_{12} \\ y_{21} & y_{22}' \end{bmatrix} \begin{bmatrix} \int v_{1a} dt \\ \int v_{2a} dt \end{bmatrix} \quad (49)$$

$$\begin{bmatrix} i_{1b} \\ i_{2b} \end{bmatrix} = \begin{bmatrix} y_{11}' & y_{12} \\ y_{21} & y_{22}' \end{bmatrix} \begin{bmatrix} \int v_{1b} dt \\ \int v_{2b} dt \end{bmatrix} \quad (50)$$

$$\begin{bmatrix} i_{1c} \\ i_{2c} \end{bmatrix} = \begin{bmatrix} y_{11}' & y_{12} \\ y_{21} & y_{22}' \end{bmatrix} \begin{bmatrix} \int v_{1c} dt \\ \int v_{2c} dt \end{bmatrix} \quad (51)$$

When the phase currents $i_{2a}$, $i_{2b}$ and $i_{2c}$ of the $\Delta$ connection cannot be detected, the admittances cannot be computed according to the equations (49) to (51). Therefore, the difference between the equations (49) and (51) is taken to obtain the following equation (52):

$$\begin{bmatrix} i_{1a} - i_{1c} \\ i_{2ac} \end{bmatrix} = \begin{bmatrix} y_{11}' & y_{12} \\ y_{21} & y_{22}' \end{bmatrix} \begin{bmatrix} \int (v_{1a} - v_{1c}) dt \\ \int (v_{2a} - v_{2c}) dt \end{bmatrix} \quad (52)$$

This equation (52) provides the admittances relating to the phases a–c, and, by the use of this equation (52), the present invention can be applied to the transformer structure shown in FIG. 16. The same applies also to the phases b–a and phases c–b.

It will be understood from the foregoing detailed description that the present invention provides a transformer protection system of digital type which can identify an internal fault of a transformer at high speed and with high sensitivity by simple computation of equations which include coefficients of known values only that can be determined with high accuracy.

We claim:

1. A transformer protection system comprising a transformer connected to an electric power system, means for detecting variation of driving point admittances or shunt admittances of said transformer or electrical quantities determined by these admittances, and, upon detection of the variation, deciding that an internal fault has occurred in said transformer, and means for generating a trip enabling signal to disconnect said transformer from the electric power system.

2. A transformer protection system as claimed in claim 1, wherein said detecting means detects variation of shunt admittance currents as said electrical quantities determined by said driving point admittances or said shunt admittances.

3. A transformer protection system as claimed in claim 1, wherein said detecting means detects variation of differentiated values of shunt admittance currents as said electrical quantities determined by said driving point admittances or said shunt admittances.

4. A transformer protection system according to claim 1, wherein said transformer includes at least primary and secondary windings.

5. A transformer protection system comprising a transformer connected to an electric power system, means for computing driving point admittances or shunt admittances of said transformer, detecting deviation of the computed driving point admittances or shunt admittances from predetermined reference values and, upon detection of the deviation, deciding that an internal fault has occurred in said transformer, and means for generating a trip enabling signal to disconnect said transformer form the electric power system.

6. A transformer protection system according to claim 5, wherein said transformer includes at least primary and secondary windings.

7. A transformer protection system comprising a transformer connected to an electric power system, means for receiving currents and voltages detected at individual terminals of said transformer as inputs, means for computing driving point admittances or shunt admittances of said transformer on the basis of the voltage and current inputs and predetermined transfer admittances of said transformer, detecting deviation of the computed driving point admittances or shunt admittances from predetermined reference values, and, upon detection of the deviation, deciding that an internal fault has occurred in said transformer, and means for generating a trip enabling signal to disconnect said transformer from the electric power system.

8. A transformer protection system as claimed in claim 7, wherein said computing means previously computes the transfer admittances of said transformer on the basis of leakage inductances of said transformer and stores the computed values in memory means.

9. A transformer protection system as claimed in claim 7, wherein said computing means computes the transfer admittances of said transformer on the basis of leakage inductances of said transformer previously computed and stored in memory means.

10. A transformer protection system according to claim 7, wherein said transformer includes at least primary and secondary windings.

11. A transformer protection system comprising a transformer connected to an electric power system, means for receiving currents and voltages detected at individual terminals of said transformer as inputs, means for computing shunt admittance currents of said transformer on the basis of the voltage and current inputs and predetermined transfer admittances of said transformer and, on the basis of the magnitudes of the computed shunt admittance currents and those of integrated values of said voltage inputs, deciding that an internal fault has occurred in said transformer, and means for generating a trip enabling signal to disconnect said transformer from the electric power system.

12. A transformer protection system as claimed in claim 11, wherein said computing means previously computes the transfer admittances of said transformer on the basis of leakage inductances of said transformer and stores the computed values in memory means.

13. A transformer protection system as claimed in claim 11, wherein said computing means computes the transfer admittances of said transformer on the basis of leakage inductances of said transformer previously computed and stored in memory means.

14. A transformer protection system according to claim 11, wherein said transformer includes at least primary and secondary windings.

15. A transformer protection system comprising a transformer connected to an electric power system, means for receiving currents and voltages detected at individual terminals of said transformer as inputs, means for computing differentiated values of shunt admittance currents of said transformer on the basis of the voltage and current inputs and predetermined transfer admittances of said transformer, and, on the basis of the magnitudes of the differentiated values of the shunt admittance currents and those of the voltage inputs, deciding that an internal fault has occurred in said transformer, and means for generating a trip enabling signal to disconnect said transformer from the electric power system.

16. A transformer protection system as claimed in claim 15, wherein said computing means previously computes the transfer admittances of said transformer on the basis of leakage inductances of said transformer and stores the computed values in memory means.

17. A transformer protection system as claimed in claim 15, wherein said computing means computes the transfer admittances of said transformer on the basis of leakage inductances of said transformer previously computed and stored in memory means.

18. A transformer protection system according to claim 5, wherein said transformer includes at least primary and secondary windings.

19. A transformer protection system comprising a transformer connected to an electric power system, means for detecting variation of driving point admittances, shunt admittances of said transformer or electrical quantities determined by these admittances, and, when the variation is detected and the difference between currents detected at two terminals of said transformer exceeds a predetermined reference value, deciding that an internal fault has occurred in said transformer, and means for generating a trip enabling signal to disconnect said transformer from the electric power system.

20. A transformer protection system according to claim 19, wherein said transformer includes at least primary and secondary windings.

21. A transformer protection system comprising:
a three transformer connected to an electric power system;
means for determining that the transformer is at of an internal fault condition and a magnetizing inrush current flowing condition based on a sum of currents flowing through the three windings of said transformer;
means for determining that the transformer is at the internal fault condition based on a magnitude of one of a driving point admittance, shunt admittances of said transformer an electrical quantities determined by these admittances; and
means for producing a trip enabling signal upon determination of the internal fault condition of the transformer.

22. A transformer protection system according to claim 21, wherein said transformer includes at least primary and secondary windings.

23. A transformer protection system comprising:
a transformer connected to an electric power system;
means for determining an internal fault condition of said transformer based on a magnitude of one of a driving point admittance, shunt admittances of said transformer and electrical quantities determined by these admittances; and
means for producing a trip enabling signal upon determination of the internal fault condition of the transformer.

24. A transformer protection system according to claim 23, wherein said transformer includes at least primary and secondary windings.

25. A transformer protection system comprising:
a transformer having at least primary and secondary windings and connected to an electric power system;
means for obtaining at least one of a driving point admittance and shunt admittance of the transformer based on a current flowing into each of the windings, a voltage across each of the windings and preliminarily obtained transfer admittances of the transformer;
means for determining that the transformer is at an internal fault condition based on a magnitude of one of the driving point and shunt admittances as obtained; and
means for disconnecting the transformer from the electric power system upon determination of the internal fault condition of the transformer.

26. A transformer protection system comprising:
a transformer having at least primary and secondary windings and connected to an electric power system;
means for obtaining a current of at least one shunt admittance of the transformer based on a current flowing into each of the windings, a voltage across each of the windings and preliminarily obtained transfer admittances of the transformer;
means for determining that the transformer is at an internal fault condition based on a magnitude of the current of said at least one shunt admittance as obtained and an integration of the voltage across each of the windings; and
means for disconnecting the transformer from the electric power system upon determination of the internal fault condition of the transformer.

27. A transformer protection system comprising:
a transformer having at least primary and secondary windings and connected to an electric power system;
means for obtaining a differential value of a current of at least one shunt admittance of the transformer based on a current flowing into each of the windings, a voltage across each of the windings and preliminarily obtained transfer admittances of the transformer;
means for determining that the transformer is at an internal fault condition based on the differential value of the current of said shunt admittance as obtained and a magnitude of the voltage across each of the windings; and
means for disconnecting the transformer from the electric power system upon determination of the internal fault condition of the transformer.

* * * * *